May 15, 1923.
W. G. COX
1,455,573
SPRING BRACKET AND FENDER
Filed Feb. 6, 1923
2 Sheets-Sheet 1
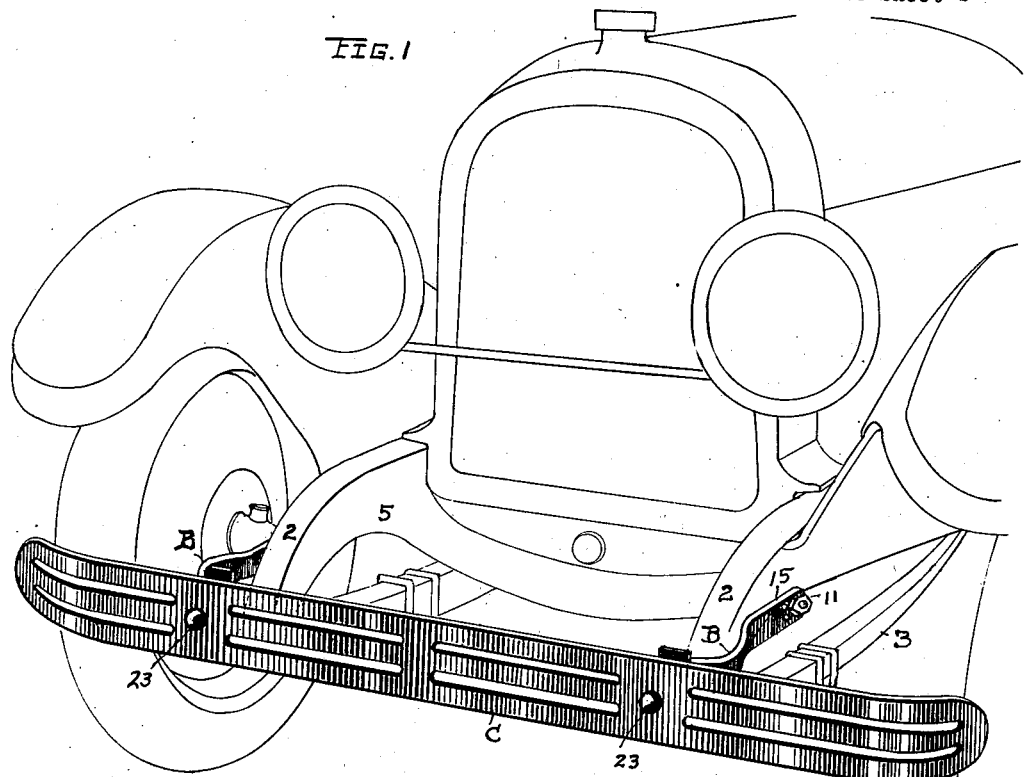
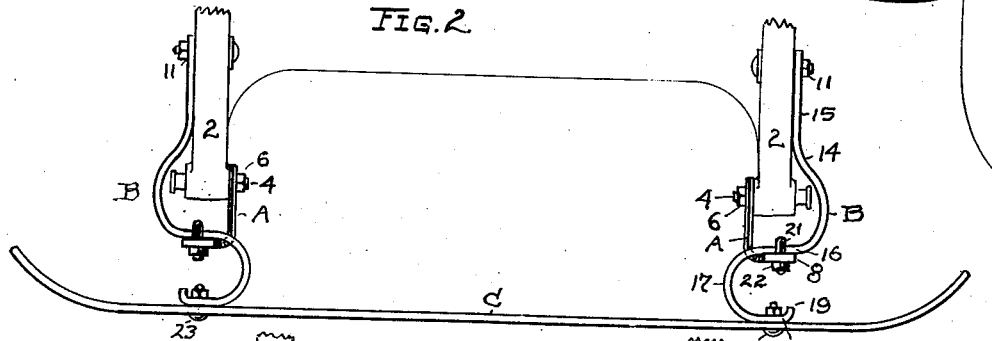
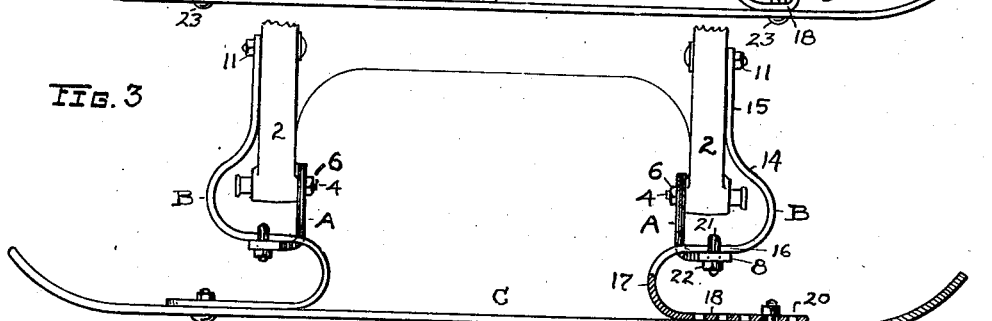
INVENTOR.
W. G. COX
By Fisher, Moser & Moon Attorneys May 15, 1923.
W. G. COX
1,455,573
SPRING BRACKET AND FENDER
Filed Feb. 6, 1923
2 Sheets-Sheet 2
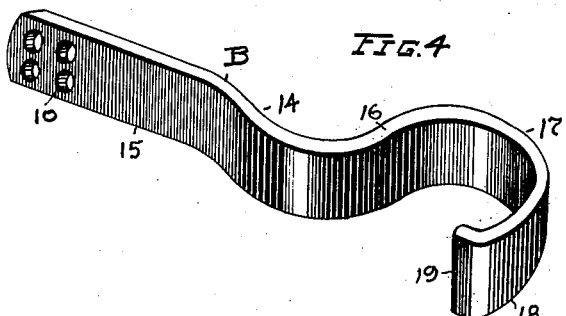
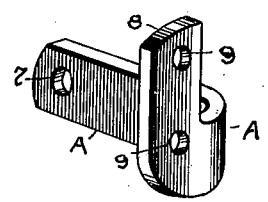
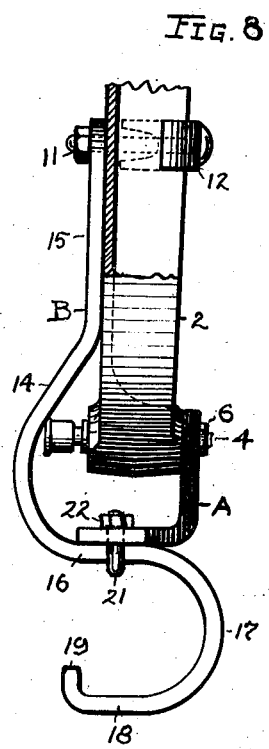
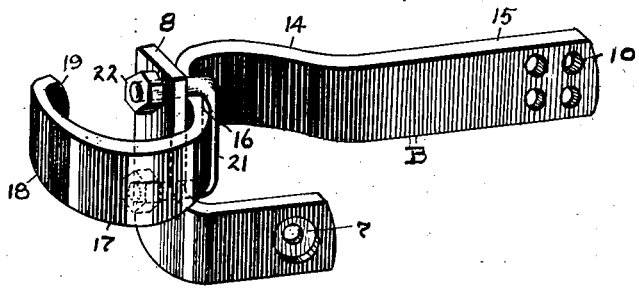
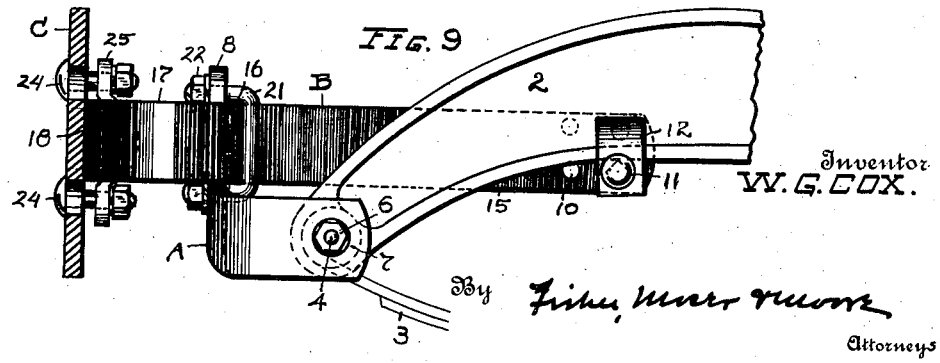
Inventor
W. G. COX.
By Fisher, Marr Moore
Attorneys Patented May 15, 1923.

1,455,573

UNITED STATES PATENT OFFICE.

WILLIAM G. COX, OF CLEVELAND, OHIO.

SPRING BRACKET AND FENDER.

Application filed February 6, 1923. Serial No. 617,272.

*To all whom it may concern:*

Be it known that I, WILLIAM G. COX, a citizen of the United States, residing at Cleveland, in the county of Cuyahoga and State of Ohio, have invented certain new and useful Improvements in a Spring Bracket and Fender, of which the following is a specification.

The present invention is an improvement in spring brackets for vehicle fenders and bumpers, and the object of the invention is to provide a sectional bracket in which one section is particularly constructed to permit a bumper bar, fender plate, or impact shield to be detachably secured thereto and to support the same with resilient cushioning effect at a predetermined elevation on the vehicle frame, and in which the other section is particularly designed to be detachably connected to the first section and to the shackle bolt for the vehicle spring to support and brace said first section.

In the drawings accompanying this application:

Figure 1 is a perspective view of the front end of an automobile and my improved fender plate and spring bracket mounted thereon;

Figure 2 is a top view of the fender plate and spring brackets connected with the vehicle frame;

Figure 3 is a top view of a narrower vehicle frame with a slightly modified form of spring bracket;

Figure 4 is a perspective view of the spring bracket section;

Figure 5 is a perspective view of the clip bolt;

Figure 6 is a perspective view of the bracing section;

Figure 7 is a perspective view of the bracket sections united together by the clip bolt;

Figure 8 is a top view of the united bracket sections secured to the curved extremity of one side member of an automobile frame; and Figure 9 is a side elevation of the assembly shown in Figure 8 with an impact shield attached to the spring bracket section.

Automobiles in general are built on chassis frames having channel members at each side terminating in downwardly curved or slanting extremities 2 to which the suspension springs 3 are shackled by a bolt 4. The open channeled sides of the side members face inwardly and are usually covered at the front end of the machine by an apron 5, but the shackle bolts 4 and their respective nuts 6 are exposed and accessible. The present invention comprises a bracket made in two sections or parts A and B, respectively; section A being especially designed to permit attachment to the inner side of frame ends 2 by means of shackle bolt 4 and nut 6, and section B being made to permit its attachment to the outer side but at a higher point than the shackle bolt and rearwardly in respect thereto. Thus bracket section A consists of a flat bar of metal which is provided at one end with a countersunk opening 7 adapted to receive the shackle bolt 4 and nut 6, and its opposite end is bent upwardly in its edge portion to provide a vertical flat post or arm 8 having a pair of spaced bolt openings 9—9. The flat sides of vertical arm 8 are also placed at a right angle to the flat sides of the horizontal arm having opening 7 by bending the bar abruptly contiguous to vertical arm 8, so that when bracket section A is attached to frame end 2 the vertical arm will stand upright directly in front of said frame end where it may be engaged by and rigidly connected to section B. To serve that end, section B consists of a flat bar of metal which is straight except for reversely curved bends in its flat sides which give it an S shape viewed edge on. Thus the rear extremity of section B is straight and provided with one or more openings 10 therein to permit a bolt and nut 11 and a suitable clamping device 12 to be used in clamping this end portion firmly to frame 2, and the middle portion of the bar is offset at 14 in respect to its straight shank 15 and then curved to extend transversely in front of the vehicle frame 2 to provide a short straight clamping portion 16 adapted to be secured in flat facial contact with either the front or the rear face of vertical arm 8 of section A. From this point section B extends forwardly on a sweeping curve or round bend 17 and thence reversely in front of and parallel with the middle clamping portion 16 to provide a second straight clamping portion 18 which may be relatively short and bent back with a lip 19 as shown in Fig. 2, or which portion 18 may be made relatively long and provided with a series of bolt openings 20 as shown in Fig. 3.

When bracket sections A and B are attached to frame 2 the longer section B lies in a higher horizontal plane than the shackle bolt 4 and parallel with the horizontal arm of section A, and the two sections meet and overlap in front of the frame at the middle connecting part 16 of the S curve in section B where arm 8 of section A extends sufficiently above the upper edge of section B to permit the legs of a clip or U-bolt 21 to straddle portion 18 and pass through bolt openings 9 in arm 8 for screw connection with tightening nuts 22. A bumper bar, fender plate, or impact member of any suitable width, make or kind may be fastened to the front spring extensions 18 of bracket section B, it being understood that duplicate brackets are employed to support such a bar, plate or impact member. As an exemplification, a heavy metal fender plate C may be detachably fastened to the spring extensions 18 by bolts and nuts 23, as shown in Figs. 1 to 3, inclusive, or this plate may be secured in place by bolts and nuts 24 and a clamping strap 25 as shown in Fig. 9.

What I claim is:

1. A spring bracket for a vehicle fender, comprising a pair of attachment sections adapted to be affixed on opposite sides of a vehicle frame member and interconnected in bracing relation in front of said member, one of said sections having a spring supporting extension for an impact member.

2. A spring bracket for a vehicle fender, comprising a pair of attachment sections, each having a horizontal arm adapted to be affixed to the vehicle frame and portions overlapping and united in front of the frame, one of said sections having an integral spring extension adapted to support an impact member.

3. A spring bracket for a vehicle fender, comprising a pair of sections having rear attachment extremities and front connecting portions, one of said sections having a reversely curved spring extension projecting forwardly from its connecting portion.

4. A spring bracket for a vehicle fender, comprising a pair of sections having parallel attachment arms of different length and transverse connecting portions united rigidly together, one of said sections having an integral spring arm extending forwardly and transversely to provide a resilient support for an impact member.

5. A spring bracket for a vehicle fender, comprising an attachment section having a horizontal arm and a vertical arm, a second attachment section having a horizontal shank and a transversely-bent portion and a reversely-curved spring extension, and means uniting said vertical arm and transversely bent portion together.

6. A spring bracket for a vehicle fender, comprising an attachment section having a horizontal arm adapted to be secured to the vehicle by a shackle bolt and bent upwardly at its front end to provide a vertical bracing arm, a second attachment section having a horizontal shank adapted to be secured to the vehicle in a higher plane than said shackle bolt and bent transversely to permit clamping engagement with said bracing arm and thence extended forwardly to provide a spring support for an impact member, and means adapted to clamp said sections together.

7. A spring bracket for a vehicle fender, comprising a relatively short attachment section having a vertical arm, and a longer attachment section having a reversely-curved middle and front portion forming a bracing connection for said arm and a spring supporting extension for an impact member.

8. A spring bracket for a vehicle fender, comprising a bar bent at right angles in its flat surface and thence upwardly at right angles at its edge and having bolt openings in its angular extremities, a second bar having a straight rear end provided with a bolt opening and a middle and front end reversely-curved and forming a bracing connection for said first section and a spring extension for an impact member, and means adapted to bolt said sections rigidly together.

9. A spring bracket for a vehicle fender, comprising a pair of sections having attachment arms of different length adapted to be clamped upon opposite sides of a projecting part of a vehicle frame, said sections having opposed transversely bent portions, a bolt uniting said transversely bent portions together, and one of said sections having its transversely-bent portion extended and curved reversely in front thereof and forming a spring support for an impact member.

10. A vehicle fender, comprising an impact member, and duplicate spring supporting brackets therefor, each bracket comprising a pair of sections having separate attachment arms and overlapping bracing portions, and one section having a spring arm extending forwardly and transversely from its bracing portion.

In testimony whereof, I affix my signature hereto.

WILLIAM G. COX.